United States Patent [19]

Barge

[11] Patent Number: 4,459,521
[45] Date of Patent: Jul. 10, 1984

[54] CONTROL BOX FOR A DRIVING MOTOR OF A SLIDABLE PANEL OF A VEHICLE, IN PARTICULAR FOR A WINDOW RAISER

[75] Inventor: Jean Barge, Montbeliard, France
[73] Assignee: Aciers et Outillage Peugeot, Audincourt, France
[21] Appl. No.: 391,251
[22] Filed: Jun. 23, 1982
[51] Int. Cl.³ .............................................. H02P 1/26
[52] U.S. Cl. .................................. 318/257; 318/445; 318/305
[58] Field of Search .................. 318/305–306, 318/308–309, 385, 391, 392, 445, 461, 466, 779, 430, 431

[56] References Cited

U.S. PATENT DOCUMENTS

| | | | |
|---|---|---|---|
| 3,624,473 | 5/1970 | Robbins | 318/466 |
| 4,006,392 | 2/1977 | Catlett et al. | 318/467 |
| 4,107,586 | 8/1978 | Buchwald et al. | 318/391 |
| 4,162,437 | 7/1979 | Keith et al. | 318/391 |
| 4,164,692 | 8/1979 | Mitterer et al. | 318/468 |
| 4,350,944 | 9/1982 | Strauch, Jr. | 318/779 |
| 4,366,425 | 12/1982 | Shen | 318/445 |
| 4,373,149 | 2/1983 | Coste | 318/445 |
| 4,422,030 | 12/1983 | McAllise | 318/779 |

FOREIGN PATENT DOCUMENTS

2013428A  8/1979  United Kingdom ............... 318/265

Primary Examiner—G. Z. Rubinson
Assistant Examiner—A. Evans
Attorney, Agent, or Firm—Sughrue, Mion, Zinn, Macpeak and Seas

[57] ABSTRACT

In this control box, a first switching device (R-1) is actuated when the operator acts on a selector (1) whereby he can choose, on one hand, the direction of the driving of the motor (9) and, on the other hand, by means of a brief or prolonged action, the driving speed of this motor. If the action is prolonged, the switching device (R-1) is inhibited by a second switching device (R-2) controlled by a timing circuit (27) which was initiated at the start of the action. This second switching device then supplies power to the motor (9) through a series resistor (18) so long as the selector (1) is actuated. Application in an electric window raiser of an automobile vehicle.

12 Claims, 7 Drawing Figures

FIG_1

CONTROL BOX FOR A DRIVING MOTOR OF A SLIDABLE PANEL OF A VEHICLE, IN PARTICULAR FOR A WINDOW RAISER

DESCRIPTION

The present invention relates to the driving of slidable panels of vehicles such as the window glasses, the sliding roofs, etc. More precisely, it concerns a control box for such driving motors of a slidable panel of a vehicle in respect of which the supply in the opening and closing directions of the motor can be controlled by means of a selector having two sections, each of which sections pertains to one of said directions, this box further comprising means for selecting two speeds of the motor as a function of an initial duration of actuation of the selector which is greater than or less than a predetermined first period.

A box of this type is disclosed in French Pat. No. 2 484 168 filed on June 5, 1980 in the name of the Applicant. This box, whose circuit is substantially fully electronic, operates satisfactorily but has a drawback. Indeed, assuming that the operator has chosen the low speed of the motor, the circuit supplies a lower voltage to the motor so that its power is reduced. Now, it often happens, above all with the aging of the vehicle, that the window glasses are difficult to shift from their fully opened and completely closed positions owing to stiff parts which are gradually created in the guiding elements for these glasses. This difficulty is in particular encountered in the closed position of the glass owing to the hardness of the sealing elements which considerably increases with the age of the vehicle. Another cause of a difficult start in the opening of the window may be for example frost.

An object of the invention is to provide a control box which avoids this drawback and permits starting up the movements of the slidable panel from two end positions, even if the low speed is selected initially by the operator.

The invention provides a control box of the type described hereinbefore, further comprising means which, when the low speed is selected, supply power to the motor so as to operate it at high speed in a second predetermined starting up period.

As a result of these features, the motor always starts up at full power for driving the slidable panel with a maximum of effectiveness at the start of the movement, and, if the low speed is selected initially, the motor only adopts this low speed after a brief lapse of time which is however sufficient to overcome the stiff parts in the movement of the slidable panel.

Preferably, said second predetermined starting up period is equal to the duration of the first predetermined period.

A better understanding of the invention will be had from the ensuing description of several embodiments of the invention with reference to the accompanying drawings in which.

Figure 1:
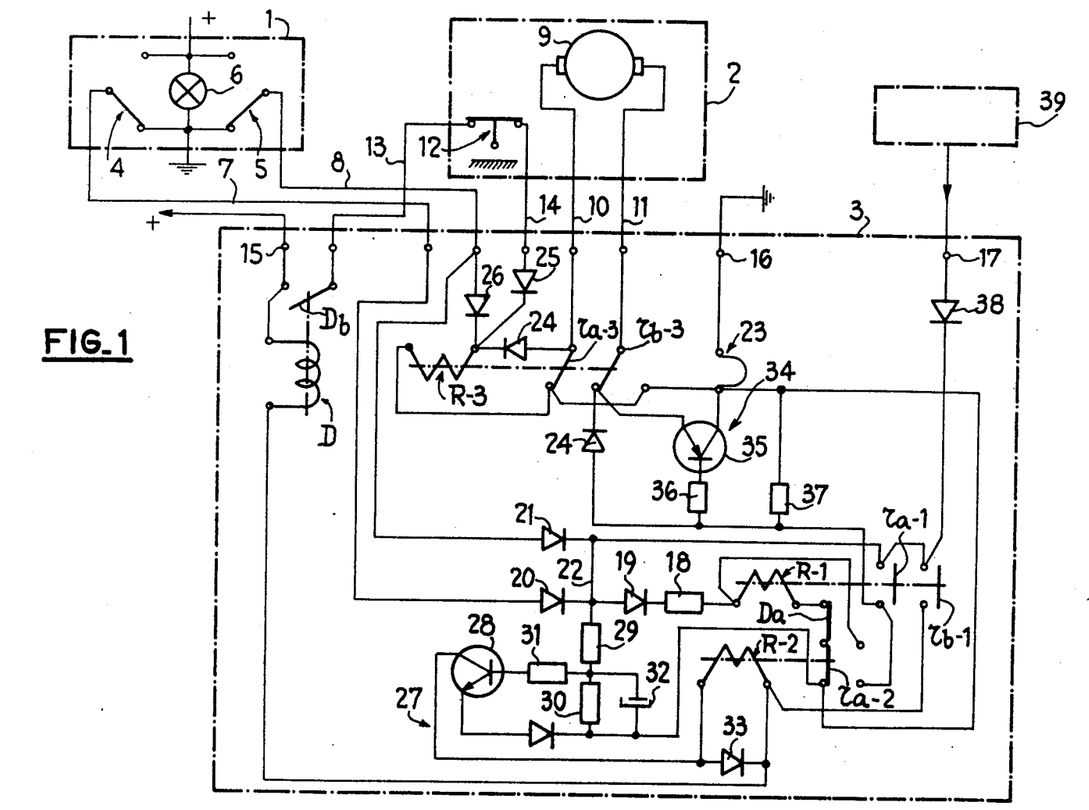
FIG. 1 is a circuit diagram of a window raiser control box carrying out the invention.

With reference first to FIG. 1, there will now be described a first embodiment of the invention applied to a window raiser of an automobile vehicle. However, the invention is not intended to be limited to this single application since it is possible to envisage the control of other slidable panels by means of the box described hereinafter.

The arrangement shown in FIG. 1 comprises, as distinct units, a selector 1, a motor unit 2 and the control box 3 proper.

The selector 1 is placed preferably within reach of the driver of the vehicle, e.g. in the centre of the dashboard. It comprises a raising inverting switch 4, a lowering inverting switch 5 and a lamp 6 illuminating the selector 1. The latter is connected between the positive terminal of the supply (not shown) and the ground. The terminals of the lamp are respectively connected to the fixed contacts of the switches 4 and 5 whose moving contacts are connected to the control box through conductors 7 and 8 pertaining respectively to the raising control and the lowering control.

The motor unit 2 comprises an electric motor 9 of conventional DC type which actuates through a speed reducer the window raiser mechanism, the assembly being conventional and consequently not illustrated.

The terminals of the motor 9 are connected to the control box 6 through conductors 10 and 11. The motor unit 2 also has a safety end-of-travel contact 12 for detecting the arrival of the window glass in the position corresponding to the end of the upward travel thereof. This contact is connected to the control box through two conductors 13 and 14.

The control box proper is supplied with positive voltage through a terminal 15 and is grounded through a terminal 16. It further comprises a centralised control terminal 17, the purpose of which will be explained hereinafter.

The control box comprises a first relay R-1 provided with two working contacts $r_a$-1 and $r_b$-1 of which the second is the self-supply contact of the coil of this relay. The latter will be termed hereinafter the high speed control relay.

A second relay R-2 is provided and comprises a switch contact $r_a$-2 hereinafter termed the low speed control. The control box finally comprises a third relay R-3 having two reversing contacts $r_a$-3 and $r_b$-3, the function of this relay being to reverse the direction of rotation of the electric motor 9.

The positive supply terminal 15 of the control box 3 is connected to a current intensity detector D which is associated with at least one control contact designated by the respective references $D_a$ and $D_b$.

The detector comprises a coil having a few turns connected directly to the positive terminal 15 and moreover to one of the terminals of the coil of the relay R-2. This same terminal is connected to the self-supply contact $r_b$-1 of the relay R-1.

The coil of the relay R-1 is connected, on one hand, to the contact $D_a$ of the detector 2 and, on the other hand, to a series resistor 18 which is connected in series with the driving motor 9 and also with two diodes 19 and 20 which are connected in series and are connected in series with the reversing contact 4 of the selector 1. The point of junction between the coil of the relay R-1 and the resistor 18 is connected to one of the sides of the switch $R_a$-2 of the relay R-2 (working position), the other side of this contact being connected to the contact $r_a$-1 of the relay R-1. The opposite side of this contact is connected to the self-supply contact $r_b$-1 and also, through a diode 21, to the conductor 8 and thence to the reversing contact 5 of the selector 1. The point of junction between the diodes 19 and 20 is connected through a conductor 22 to the point of junction between the diode 21 and the working contact $r_a$-1 of the relay R-1.

The terminals of the motor 9 are connected to the moving contacts of the reversing switches $r_a$-3, $r_b$-3 of the relay R-3, the fixed contacts of which, three in number, are connected in the following manner. The outer points of contact are connected respectively together to one of the sides of the coil of the relay R-3 and to the ground through a terminal protection element 23. The intermediate fixed point of contact of the relay R-3 is connected through a diode 24 to one of the sides of the working contact $r_a$-1 of the relay R-1.

The coil of the relay R-3 is connected through a diode 24 to the moving contact $r_a$-3 of this relay, the corresponding end of this coil being also connected, on one hand, through a diode 25, to the conductor 14 and thence to the end-of-travel contact 12 and, on the other hand, through a diode 26, to the conductor 8 and thence to the lowering reversing switch 5 of the selector 1.

The end-of-travel contact 12 is connected, through the conductor 13, to the contact $D_d$ which is open at rest, of the current intensity detector D, ie. to the end of the latter which is connected to the positive terminal of the supply.

The control box also comprises a timing circuit 27 whose active component is a transistor 28 connected in the following manner. A voltage divider comprising resistors 29 and 30 is connected, on one hand, to the point of junction between the diodes 19 and 20, and, on the other hand, to one of the sides of the switch $r_a$-2 (position of rest) of the relay R-2. The point of junction between the resistors 29 and 30 is connected, through a resistor 31, to the base of the transistor 28. The resistor 30 is connected in parallel to a capacitor 32. The common point of the resistor 30 and the capacitor 32 is connected, through a diode, to the emitter of the transistor 28 whose collector is connected to the common point between a diode 33 and one of the terminals of the coil of the relay R-2, the diode 33 being connected in parallel to this coil.

The control box further comprises a circuit 34 pertaining to the sudden stoppage of the motor 9, the active component of this circuit being a transistor 35 whose base is connected through a resistor 36 to the point of junction of the diode 24 and one of the sides of the working contact $r_a$-1 of the relay R-1. The emitter of the transistor 35 is connected to the intermediate fixed contact of the reversing switches $r_a$-3 and $r_b$-3 of the relay R-3. The collector of the transistor 35 is connected to the thermal safety element 23. A resistor 37 is connected to this safety element 23 and also to the common point of the diode 24 and the resistor 36.

The centralised control terminal 17 is connected through a diode 38 to the working contact $r_b$-1 of the relay R-1. Note that the centralised control means are symbolically designated by the rectangle carrying the reference 39.

The circuit shown in FIG. 1 operates in the following manner:

As already mentioned, the motor 9 is of the DC type coupled with a speed reducer. It may or may not include its own internal thermal circuit breaker.

The thermal circuit breaker 23 placed in the control box 3 has for purpose to ensure the stoppage at the end of the upward or downward travel of the window glass and avoid the provision of the end-of-travel contact 12 in the door. Consequently, this contact may be provided as an option.

The relay R-1 ensures operation at high speed when the selector 1 receives a brief order from the operator.

The relay R-2 ensures the operation at low speed when the operator actuates the selector for a longer period and this relay puts the series transistor 18 in circuit.

The relay R-3 determines the direction of rotation of the motor 9 which rotates in the glass raising direction when the relay is not excited and in the opposite direction in the opposite case.

The timing circuit 27 retards the excitation of the coil of the relay R-2 in the case where the selector receives a prolonged order. This important aspect of the invention will be explained in more detail hereinafter. Note that the timing operation ensured in the example by the timing circuit 27 may be integrated in the very construction of the relay R-2, as is conventional in the art.

The circuit 34 causes the sudden stoppage of the motor 9 and it should be noted that this circuit is not essential for achieving the essential functions of the control box.

The contact $D_a$, which is closed at rest and associated with the coil of the current intensity detector D, constitutes a safety device which stops the motor 9 when it is supplied for high speed operation.

The contact $D_b$, which is open at rest and associated also with the coil of the detector D, is connected in series with the end-of-travel contact 12 so as to reverse the operation of the motor 9 in the case where the intensity of the supply current for the latter exceeds a predetermined limit, the action of this contact $D_b$ being suppressed by the opening of the end-of-travel contact 12 when the window glass is close to the fully closed position.

When either one of the reversing switches 4 or 5 of the selector 1 is briefly actuated by the operator, the positive supply voltage is briefly applied either to the conductor 7 or to the conductor 8 for operating the motor 9 in the corresponding direction.

Indeed, the brief actuation of one of the reversing switches 4 and 5 excites the coil of the relay R-1 through a circuit formed respectively through one or the other of the diodes 21 or 22, the diode 19, the series resistor 18, the coil of the relay R-1, the contact $D_a$ and the contact $r_a$-2 which is grounded through the thermal circuit breaker 23. The relay R-1 is then immediately supplied with current, through its contact $r_b$-1 which connects the coil of the relay to the positive terminal of the supply through the coil of the detector D. In this case, the motor 9 is supplied with full voltage and operates at high speed, it being supplied through the diode 24 and the contacts $r_a$-1 and $r_b$-1. Of course, the relay R-3 is excited when the operator actuates the reversing switch 5 of the selector 1 through the conductor 8 and the diode 26 and the coil of this relay remains self-supplied through the moving contact $r_a$-3. In the opposite case, ie. when the operator selects the reversing switch 4, the relay R-3 is not excited and the current passes through the motor in the opposite direction. There will now be examined the case in which the operator effects a prolonged action on either of the reversing switches 4 and 5 of the selector 1. At the start of the operation, everything occurs in the same way as described previously, ie. the motor is made to operate initially at high speed through the same circuits as described hereinbefore. This essential feature of the invention permits, even if the low speed is chosen by the operator, the obtainment of a maximum driving torque for disengaging the window glass from its totally closed or totally opened position and for overcoming also other possible mechanical jamming.

Actuation of the reversing switches 4 and 5 of the selector 1 in any case initiates the timing circuit 27 whose RC circuit constituted by the resistor 30 and the capacitor 32 determines a predetermined period of time which is, for example, of the order of 0.5 second. If the action on the reversing switches 4 and 5 continues beyond this predetermined period, the transistor 28 is rendered conductive by the voltage developed at the terminals of the aforementioned RC circuit, thereby establishing a supply circuit for the coil of the relay R-2. The excitation of this relay reverses the switch $r_a$-2 which has for result:

1. The stoppage of the excitation of the relay R-1 and the opening of these contacts, the motor 9 being thus cut off from the supply through a direct circuit. p 2. The supply of power to the motor through the series resistor 18 through the diode 20 or 21, the diode 19, the switch $r_a$-2, the diode 24 and the contacts $r_a$-3 and $r_b$-3 of the relay R-3.

As the motor 9 is thus supplied with power through the series resistor 18, it receives a lower voltage and therefore rotates at low speed in order to permit a finer adjustment of the required stopping positions of the glass.

When either of the reversing switches 4 or 5 is released, the glass stops in the desired position, since the motor 9 is supplied through the respective reversing switch and no longer receives power.

The operation of the sudden stoppage circuit 34 is based on the fact that any DC motor having a permanent magnet operates as a generator when it rotates under no load and produces at its terminals a voltage of the same polarity as its supply voltage for a given direction of rotation. It is also known that such a motor stops immediately when these terminals are shorted.

If the motor 9 rotates in the raising direction, it produces a positive voltage in the conductor 11 when its supply is cut off and if it rotates in the direction for lowering the glass, it produces a positive voltage in the conductor 10. In this case, the relay R-3 is actuated and the positive voltage is therefore transmitted to the fixed intermediate contact of the relay R-3, this contact being connected to the diode 24.

In both cases, as the supply through this diode is cut off by hypothesis and, owing to the presence of the impedance formed by this diode, the potential of the intermediate contact mentioned above is higher on the cathode of the diode than on the anode. This results in the conduction of the transistor 35 whose emitter-collector circuit is then connected in parallel to the motor 9. As the latter is shorted, its stoppage is sudden, irrespective of the direction of rotation.

Any action on the selector 1 results in rotation of the motor without lost time when the circuit is at rest.

When an order is given by the reversing switches 4 or 5 and when an immediate change in direction is designated by the operator, the circuit immediately reverses the direction as concerns the rapid rising of the glass.

If the motor 9 operates at high speed in the raising direction, a lowering order produced by the reversing switch 5 excites the relay R-3 which produces the immediate direction reversal.

If the motor 9 operates at high speed in the direction of the descent, a raising order transmitted to the conductor 7 stops the motor. Indeed, at high speed, and in the descending direction, the relays R-1 and R-3 are excited and self-supplied.

If the order transmitted through the conductor 7 is less than the timing period of the circuit 27, nothing happens, if it is greater than this period, the motor changes to low speed and stops when the reversing switch 4 or 5 is released; it is then sufficient to give the required order to produce the reversal.

If the motor operates at low speed, the timing having elapsed the reversing switch 4 or 5 is then maintained and the relays R-1 and R-3 are released. The relay R-2 is actuated as soon as it is desired to reverse the direction, and the reversing switch 4 or 5 is then put in the intermediate position and then the circuit is supplied with power for the reversing direction.

The thermal circuit breaker 23 always carries the current consumed by the whole of the circuit and mainly by the motor 9. If the intensity of this current exceeds a certain predetermined threshold value, the circuit breaker opens the general circuit of return to the ground so that the relays resume an at rest position even if the switch 4 or 5 is actuated.

Thus the circuit permits achieving:

the complete stoppage in the event of any accidental short-circuit and consequently, the general protection of the electric circuit of the vehicle;

the complete stoppage at the end of the raising or lowering travel of the window glass, even if the operator continues to act on the reversing switch 4 or 5;

the stoppage in the intermediate position subsequent to an accidental jamming of the window glass caused by some obstacle or an excessive increase in the mechanical resistance which opposes the displacement of the glass.

Breakdowns as concerns electronic components are possible and mainly the deterioration of the transistors 28 and 35:

the deterioration of the transistor 35 has no effect spaced from a less sudden stoppage of the motor 9; further, its short-circuit is brief and will act as a fuse;

the deterioration of the transistor 28 always permits the operation at high speed; if it is short-circuited, the operation at low speed is always possible; further, the use of a mechanical timing relay for the relay R-2 would permit dispensing with the transistor 28.

Consequently, irrespective of the breakdown of the most delicate electronic components, the closing or opening operation is maintained at the will of the operator, the safety measures being moreover ensured.

The circuit just described also ensures special safety measures which are, on one hand, the stoppage of the window glass when it encounters an obstacle when displaced upwardly at high speed and, on the other hand, the reversal of the movement of the window glass against an obstacle in the course of this same movement.

These two safety functions are ensured by the contact $D_a$ which is open when the current in the coil of the detector D exceeds a predetermined intensity. This coil detects the intensity of the current in the motor when the latter drives the glass at high speed in the upward or downward direction. If the contact $D_a$ opens, the supply to the coil of the relay R-1 is cut off and the circuit of the motor 9 is interrupted. The current detector D can be adjusted for an intensity threshold which is just sufficient to ensure that the movement of the glass is not liable to harm persons whose members might constitute an obstacle to its movement.

The movement of the glass may be reversed by the contact $D_b$ which is also controlled by the coil of the detector D. Indeed, when the previously-mentionned threshold is exceed, this contact $D_b$ is closed, the relay R-3 is excited and reverses the direction of rotation of the motor 9 for lowering the glass. The action of the contact $D_b$ is neutralised or overridden when the glass is in its upper closed position since, in this case, the end-of-travel contact 12 is open and the coil of the relay R-3 consequently cannot be excited.

Figure 2:
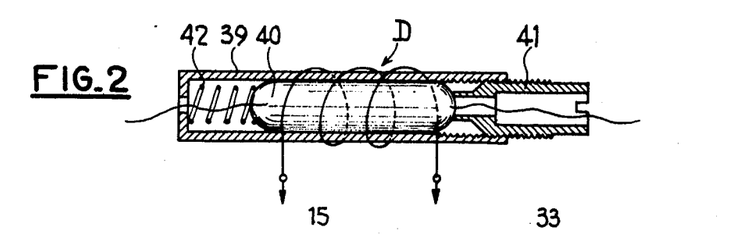
FIG. 2 is an axial sectional view of a current intensity detector employed in the control box of FIG. 1.

FIG. 2 shows an advantageous embodiment of the current detector D. The latter comprises a sleeve 39 in which is disposed a bulb 40 in which are placed a plurality of flexible strip contacts, the bulb containing moreover a vacuum. The sleeve is surrounded by a coil which may be advantageously formed by a plurality of turns of the conductor connecting the terminal 15 to the common point between the coil of the relay R-2 and the diode 33. The sleeve 39 is tapped at one end for receiving an adjusting screw 41 which adjusts the sensitivity threshold of the detector D. At the opposite end, the sleeve contains a return spring which acts in opposition to the action of the screwing of the screw 41 inwardly of the sleeve. The adjustment of the latter thus causes the bulb 40 to move in either direction with respect to the coil of the detector D.

Such a current detector has a special advantage over current intensity detectors usually employed in this type of circuit and comprising as the essential component a resistor of low value connected in series with the motor driving the window raiser. Such a resistor results in a voltage drop which has a great effect on the total supply voltage which, in the case of vehicles, is relatively low (for example 12 volts). Now, in this case, a special driving motor must be made which operates at the voltage of the network of the vehicle less the voltage drop across the detection resistor, whereas with the detector just described, the voltage drop is distinctly smaller and it is possible to employ, for the motor 9, a standard 12 volt motor commonly employed for simple window raisers well known in the art. The control box 3 can thus be easily adapted to exisitng window raisers mounted on the vehicle. It will be understood that the current detector D also permits reducing the consumption of energy of the whole of the circuit.

The order to close the window glass may also come from a centralized control connected to all the window raisers of the vehicle. When this control is actuated, a positive pulse of a more or less long duration may be applied to the contact $r_b$-1 of the relay R-1. If this duration exceeds the time determined by the timing circuit 27, there could result a low-speed displacement of the glass and, if this duration is less, the glass is operated at high speed. The first case enables the user to achieve easily the airing of the vehicle by partly opening the window glasses.

Figure 3:
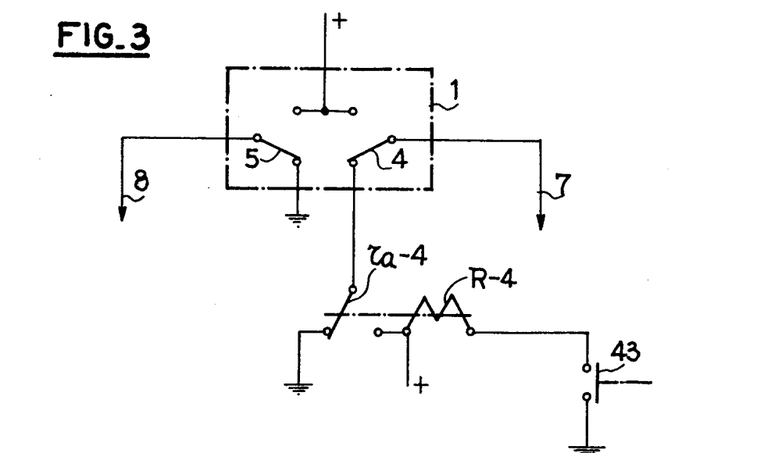
FIG. 3 is a circuit diagram for automatically raising the window glasses as a function of the actuation of a door key for example.

FIG. 3 shows a simple circuit for achieving a centralised control through means for putting out of action of the vehicle, such as the key actuating the lock of the door of the driver.

The circuit in question comprises a relay R-4 whose coil controls a reversing switch $r_a$-4. The coil of this relay is connected to the ground through a working contact 43 actuated by the means for putting out of action of the vehicle. The coil is also connected to the positive terminal of the supply and to one of the fixed contacts of its reversing switch whose other contact is connected to the ground. The moving contact $r_a$-4 is connected to the reversing switch 4 of the glass and the other reversing switch 5 of this selector is connected as in the case shown in FIG. 1.

It will be understood that, when the contact 43 is closed, the coil of the relay R-4 is actuated and consequently a pulse of positive voltage of a more or less long duration is applied through the reversing switch 4 of the selector 1 to the conductor 7 for supplying power to the motor 9 in the direction for raising the glass. This control may involve high or low speed, depending on the duration of the actuation of the contact 43, as is the case with the reversing switches 4 and 5 as previously described.

Figure 4:
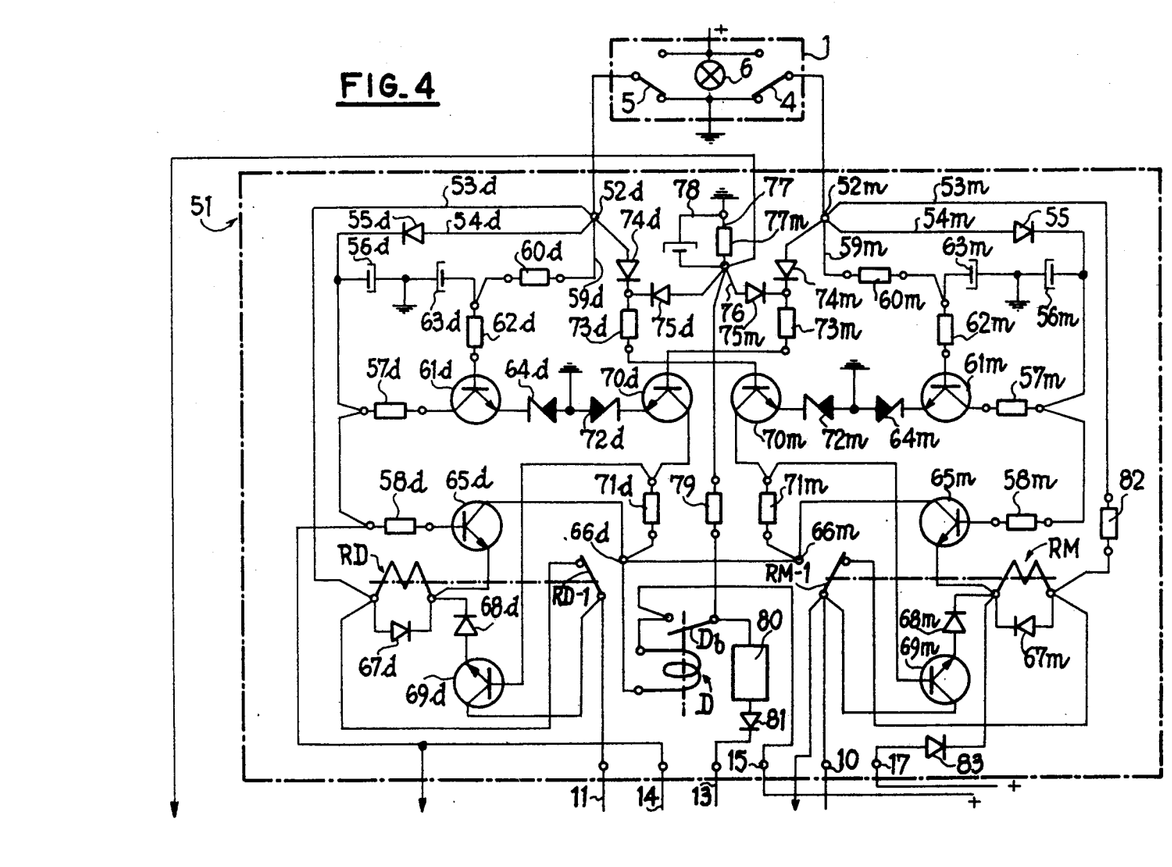
FIG. 4 and FIG. 4A represent a circuit diagram of one embodiment of the box according to the invention which differs from that of FIG. 1.
Figure 4A:
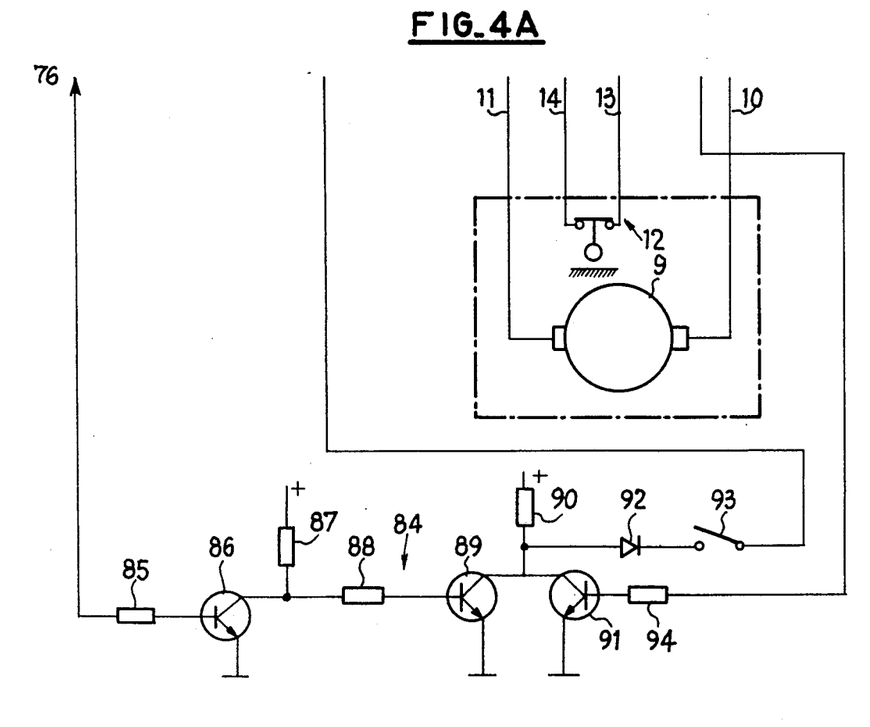

A second embodiment of the invention will now be described which is represented in FIG. 4. In this case, it concerns a servo-control box 51 connected in the same way as the control box 3 of FIG. 1 to a selector 1 constructed in the same way as before and to a drive unit comprising a motor 9 and an end-of-travel contact 12 also as previously described. As can be seen, the circuit shown in FIG. 4 comprises two quasi symmetrical parts and the symmetrical elements which correspond will therefore be designated by indices d (for the descent) and m (for the raising). These elements, insofar as they are identical and have the same function in the two symmetrical parts of the circuit, will be described only once.

It can be seen in the left part of the diagram shown in FIG. 4, which pertains to the lowering of the window glass, that the control box comprises a junction point 52d to which lead four conductors. A first conductor 53d is connected to a relay coil RD, a second conductor 54d being connected though a diode 55d to a capacitor 56d to a resistor 57d and to another resistor 58d. The third conductor 59d is connected to a resistor 60d, the capacitor 56d is connected to the ground. The resistor 57d is connected to the collector of a transistor 61d whose base is connected through a resistor 62d to a point of junction between a capacitor 63d connected to the ground and the resistor 62d. The emitter of the transistor 61d is connected through a Zener diode 64d to the ground.

The resistor 58d is connected to the base of a transistor 65d whose emitter is connected to the coil of the relay RD and whose collector is connected to a point of junction 66d formed by one of the fixed contacts of the reversing switch RD-1 controlled by the coil of the relay RD. The point of junction 66d constitutes the working contact of the reversing switch RD-1.

The coil of the relay RD is shunted by a diode 67d and the end of this coil, which is connected to the emitter of the transistor 65d, is connected to another diode 68d which is connected to the emitter of another transistor 69d. The base of this transistor is connected to a collector of a fourth transistor 70d and to a resistor 71d. The collector of the transistor 69d is connected to the moving contact of the reversing switch RD-1 which is also connected to the conductor 11 supplying power to the motor 9.

The emitter of the transistor 70d is connected through a Zener diode 72d to the ground while its base is connected to a resistor 73m. The equivalent of this resistor is the lowering or descending part of the control box, ie. the resistor 73d is connected to the base of a transistor 70m and, through its other terminal, to the point of junction 52d through a diode 74d. This same terminal of the resistor 73d is connected through a diode 75d to a point of junction 76 which is common to the two parts of the control box and is connected through a resistor 77, shunted by a capacitor 78, to the ground. The point of junction 76 is also connected to a common resistor 79 whose other end is connected to the contact $D_b$, which is open at rest, of the current intensity detector D, the latter being identical to that described with reference to FIG. 1.

The coil of this detector is connected to this contact $D_b$ and also to the points of junction 66d and 66m. The contact $D_b$ is also connected to a timing circuit 80 which is connected through a diode 81 to one of the sides of the end-of-travel contact 12. The other side of this contact is connected to one of the ends of the resistor 58d.

The box also comprises a series resistor 82 which is connected in the rising part of the control box between the coil of the relay RM and the point of junction 52m. Lastly, in this same raising part of the control box, there is provided a diode 83 which is connected between the terminal 17 and the coil of the relay RD so as to permit the centralized closure in the manner described with reference to FIGS. 1 and 3.

The control box 51 also comprises a circuit 84 for reversing the movement of the window raiser when an obstacle is encountered, this reversal being achieved only through a certain distance. The input of this circuit is constituted by the point of junction 76 which is connected through a resistor 85 to a transistor 86 whose emitter is connected to the ground and whose collector is connected, on one hand, to the positive terminal of the supply voltage through a resistor 87 and, on the other hand, through a resistor 88 to the base of another transistor 89. The emitter of the latter is connected also to the ground and its collector is connected to the positive voltage through a resistor 90 and to the collector of a fourth transistor 91 whose emitter is connected to the ground.

The common collectors of the transistors 89 and 91 are connected through a diode 92 and a contact 93, which is open at rest, to the point of junction between the resistors 57d and 58d. The base of the transistor 91 is connected through a resistor 94 to the moving contact RM-1 of the relay RM.

The circuit shown in FIG. 4 operates in the following manner:

As already mentioned, the raising and lowering movements of the window glass are achieved by symmetrical circuits.

The terminals of the motor 9 are shorted at rest through the reversing switches 4 and 5 of the selector in passing through the junction points 52d and 52m and the reversing contacts of the relays RD and RM.

High speed is achieved, when lowering, by the reversing switch RD-1 of the relay R-2 and, when raising, through the reversing switch RM-1 of the relay RM.

Low speed is obtained by placing the resistor 82 in series in the supply circuit of the motor 9, irrespective of the desired direction of displacement. The direction of rotation of the motor 9 is directly controlled by the reversing switches 4 and 5 of the selector 1. The symmetrical units constituted, on one hand, by the transistor 61d, the Zener diode 64d, the capacitor 63d, the resistor 60d, the resistor 62d and the resistor 57d and, on one other, the transistor 61m, the Zener diode 64m, the capacitor 63m and the resistors 60m, 62m, and 57m respectively constitute timing circuits.

The symmetrical units constituted by the transistors 65d, 65m, the resistors 58d, 58m control the respective coil of the relay RD or RM.

The symmetrical units mounted around the transistor 69d and 69m and 70d and 70m respectively, ensure the self-supply of their associated relays. If either of the reversing switches 4 and 5 is actuated briefly, a positive pulse shorter than the time determined by the timing circuit (shorter than 0.5 second, for example) brings the point of respective junction 52d or 52m to the positive potential. Consequently, the transistor 65d or 65m receives a positive potential both at its base through the diode 55d, 55m and the resistor 58d or 58m and, on its emitter, through the coil RD or RM.

Its collector also receives a positive voltage through points of junction 66d and 66m respectively. This transistor is therefore rendered non-conductive and the contact RD-1 or RM-1 remains at rest, which supplies power to the motor 9. If it is the reversing switch 5 which is actuated, this supply of power is effected through the resistor 82 and if, on the contrary, it is the reversing switch 4 which is actuated, this resistor remains connected in the circuit of the motor. This feature avoids the use of compensating springs when lowering the window glass for compensating for the weight of the latter. The high speeds for raising and lowering are consequently substantially identiidentical.

When one or the other of the selectors 4 or 5 is released before the end of the timing period, the positive potential applied by the selector 4 or 5 to the point of junction 52d or 52m disappears and becomes zero by a return to the ground in the selector 1.

Consequently, the transistor 61d or 61m remains non-conductive and the transistor 65d or 65m becomes conductive since, as the capacitor 56d or 56m is discharged, the base of this transistor is more positive than its emitter which is connected to the ground. Consequently, the coil RD or RM is supplied with current and swings over its contact and the motor 9 is connected to the supply terminal 15 of the circuit.

The coil of the relays RD or RM is self-supplied by its own reversing contact and the associated transistor 69d or 69m. The latter transistor became conductive as soon as its collector was brought to a positive potential and consequently as soon as the reversing contact of the relay changes position. The displacement continues at high speed until an upper or lower end position of the window glass is reached.

Note that, when the lowering or descent of the glass is ordered, the series resistor 82 remains in circuit and the motor is supplied at low power in order to take into account the weight of the panel. Thus it is possible to eliminate the compensating springs usually provided in window raisers.

If the contact 12 is not provided, the glass is then stopped mechanically in both cases and the intensity of the current absorbed by the motor 9 increases strongly beyond a threshold determined by the detector D which closes the contact $D_b$. The closure of this contact results in the polarisation at a positive voltage of the base of the transistor 70d or 70m which therefore becomes conductive while rendering the transistor 69d or 69m non-conductive, which ceases the self-supply of the associated relay and the stoppage of the motor 9.

There will now be examined the case where the operator actuates either of the reversing switches 4 or 5 for a period of time exceeding the timing period introduced by the transistors 61d or 61m and their associated circuit. The operation is identical so long as this duration has not elapsed and as soon as the base of the transistor 61d or 61m is polarised by the charging of the capacitor 63d or 63m, the transistor becomes conductive and the associated transistor 65d or 65m becomes non-conductive. The coil of the associated relay then cannot be excited and the contacts RD-1 or RM-1 remain at rest. The glass continues to move in this way since the motor M is directly supplied by the reversing switch 4 or 5 of the selector through the series resistor 82 and it continues to be supplied so long as the selector is actuated.

Note that as soon as this action ceases, the motor is shorted and this causes the sudden stoppage thereof so that the positioning of the glass may be precise as a function of the order given by the operator.

The safety functions already explained with reference to the circuit of FIG. 1 are to be found in the circuit of FIG. 4 and there is consequently no need to explain them again. It is sufficient to note that the detector D also acts as a protective circuit breaker when an accidental internal short-circuit occurs in the circuit. The latter therefore does not include a thermal safety device as is the case in the circuit of FIG. 1. Note also that the circuit of FIG. 4 presents an anti-agression function since the desire of the operator is of priority so that, if the obstacle which opposes the closure of the glass is formed by a hard object, the closure of the glass is always attempted at low speed. Indeed, the prolong action on the selector 1 constantly supplies power to the motor 9 to oblige it to supply its power without the detector D acting as a safety element being able to intervene. Moreover, in the event of failure of the electronic components, the motor 9 may be actuated at low speed.

The centralised closure may also be achieved by the application of a positive voltage pulse on the terminal 17.

The operation of the circuit will now be described for achieving a reversal of the movement of the window glass through a certain distance consequent to the encounter of an obstacle opposing the closure of the glass. This circuit comprises the transistors 86, 89 and 91. In order to detect this situation, it should be ascertained whether the glass moves in the upward direction and it is also necessary to detect the intensity of the current absorbed by the motor 9.

The base of the transistor 86 ascertains whether the contact $D_b$ is closed or, in other words, whether the intensity considered as a threshold value has been exceeded. The transistor 86 reverses this signal and applies it to the transistor 89 and constitutes one of the inputs of the AND gate formed by the transistors 89 and 91. The transistor 91 ascertains whether the motor 9 rotates in the direction for raising the glass by detecting the voltage of the moving contact RD-1 of the relay RM-1. If the two signals are present, a signal is applied to the point of junction between the resistors 57d and 58d and this supplies power to the motor M in the direction for lowering the glass.

Note that the timing occurring in the supply of power to the motor under these conditions is introduced by the combination of the capacitor 78 and the resistor 79.

Irrespective of the design of the control box, it may be disposed in the door close to the motor of the window raiser. This arrangement is advantageous when it is desired to equip only one door (or the two front doors) and the closure safety is ensured by the end-of-travel contact 12. This arrangement is advantageous also if the window raiser equipment is mounted on the vehicle as manufactured.

Figure 5:
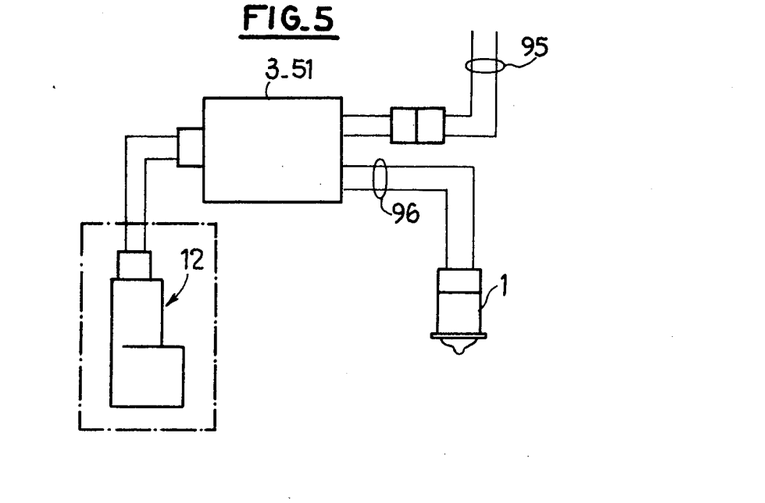
FIG. 5 is a simplified diagram of the placement of a control box according to the invention in a conventional window raiser arrangement, the box being subsequently mounted on the vehicle.

But it is also possible to mount the control box outside the door, which is shown in FIG. 5. The diagram of FIG. 5 is applicable both to the mounting of the control box at the moment of manufacturing the vehicle and to the mounting on a vehicle already equipped with a window raiser. Under these conditions, the control box 3, 51 is placed preferably not far from the selector 1. The cabling 95 which was connected to the selector in a conventional circuit is in this case connected to the control box 3, 51 while the cabling 96 connected to the selector 1 is connected to the same box. Consequently, only a single additional cabling has to be constituted between the selector 1 and the control box.

Figure 6:
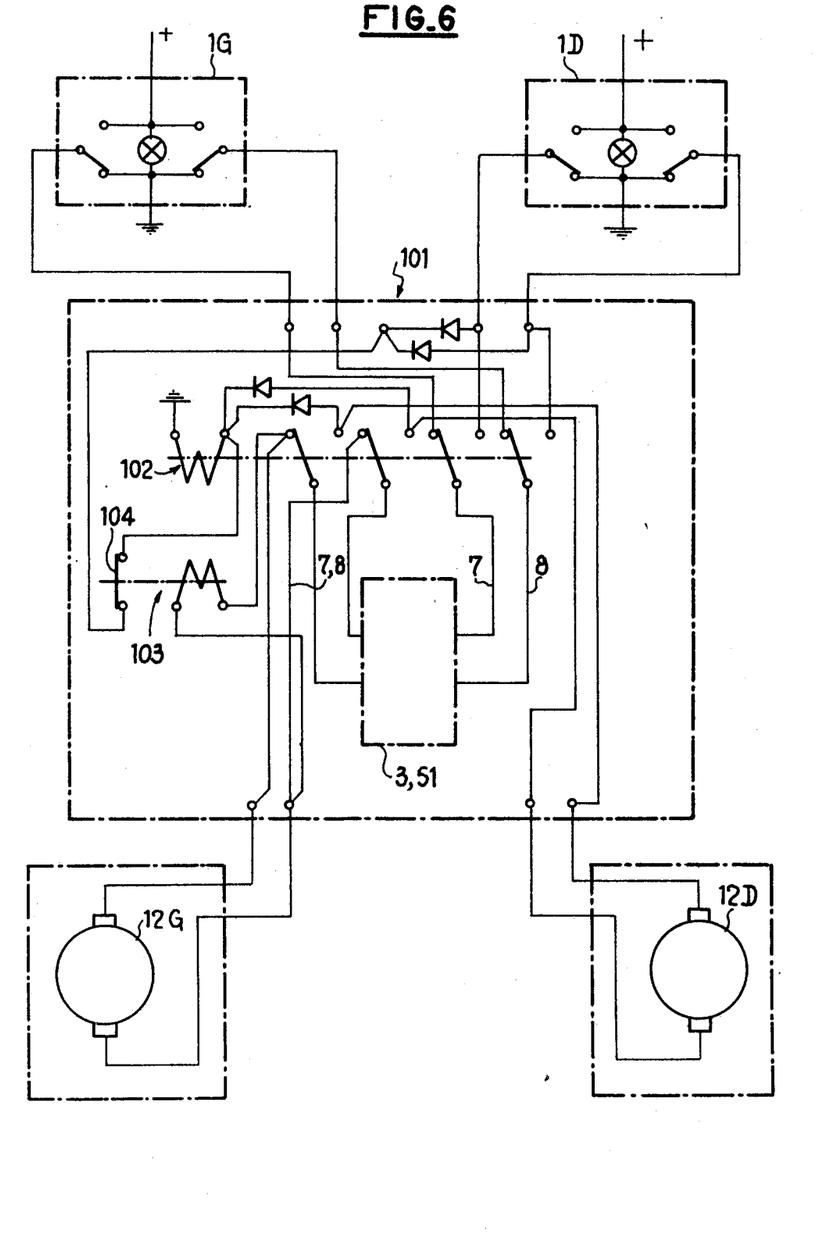
FIG. 6 is a circuit diagram comprising a single box according to the invention which may be actuated by left and right door selectors of a vehicle and selectively controls the window raiser motors of these doors.

FIG. 6 shows a modification of the circuit in which only a single control box 3, 51 is used for controlling left and right (front or rear) doors, provided an additional switching circuit 101 is provided. This circuit is connected to two window raiser motors 12G and 12D respectively and to two corresponding selectors 1G and 1D. This circuit also comprises a left-right reversing relay 102 whose coil controls four reversing switches of the conductors 7 and 8 of the control box 3, 51. Depending on the excitation of the relay 102, the control box 3, 51 is therefore connected to the left or the right window raiser. The circuit is moreover designed in such manner that when the right side is actuated, any action on the selector 1G is neutralised and vice-versa. In the illustrated circuit, the priority is given to the left selector of the conductor, this arrangement being of course reversed if the vehicle is equipped for a right hand drive. If the selector 1G is actuated in either direction, the motor 12G is actuated and a second relay 103 is excited which, through its contact at rest 104, precludes any supply of power to the circuit through the selector 1G.

On the other hand, if the selector 1D is actuated, the relay 102 is excited and the reversing switches change position, the supply of power to the motor 12G being neutralised through its reversing switches.

Having now described my invention what I claim as new and desire to secure by Letters Patent is:

1. A control box for a motor driving a slidable panel of a vehicle, such as a window glass or the like, said motor having terminals, comprising: a supply circuit for the motor, a selector associated with the motor for controlling the supply of power to the motor from said supply circuit for operating the motor selectively in a direction for opening the panel and in a direction for closing the panel, the selector having two sections each of which pertains to one of said directions, means for selecting two speeds of the motor as a function of an initial duration of actuation of the selector which is greater or less than a first predetermined period, said means for selecting the two speeds of the motor further comprising means which, when low speed operation is selected, supplies the motor at high speed during a second predetermined period for starting up the motor.

2. A control box according to claim 1, comprising a timing circuit for ensuring the first predetermined period, said timing circuit being connected in such manner as to determine also the second predetermined period.

3. A control box according to claim 2, comprising a first switching device for closing the supply circuit of the motor when said selector is actuated, a second switching device capable of cutting off the supply of the first switching device and connected to said timing circuit so as to be actuated after the elapse of the duration of the timing of the timing circuit and also capable of allowing the supply of the motor through a series resistor so long as said selector is actuated beyond said duration.

4. A control box according to claim 3, comprising switching means for determining the direction of rotation of the motor for driving the slidable panel in either direction of movement of the panel, the switching means being at rest for one of said directions and actuated for the other of said directions under the control of said selector, and the first switching device comprising a relay whose coil is connected in series with a switch which is at rest of a second relay, said switch ensuring in its working position the closure of the supply circuit of said motor through the series resistor.

5. A control box according to claim 3, wherein said first switching device comprises two relays respectively pertaining to each direction of movement of said slidable panel and provided with a reversing switch which inserts, at rest, the series resistor in the supply circuit of the motor and which, in the working position thereof, only inserts said resistor in the circuit of the motor in respect of a single direction of rotation of the motor, said relays comprising coils connected in collector-emitter circuits of associated transistors, said transistors having bases which are connected to said timing circuit, and said selector being directly inserted in the supply circuit of the motor passing through said reversing switches in the position of rest.

6. A control box according to claim 1, further comprising a current intensity detector of the magnetic type comprising switching means capable of reversing the supply of the motor when the intensity of the current passing therethrough exceeds a predetermined value.

7. A control box according to claims 4, further comprising a current intensity detector of the magnetic type comprising switching means capable of reversing the supply of the motor when the intensity of the current passing therethrough exceeds a predetermined value, the switching means of the intensity detector being inserted in a circuit controlling said switching means for ensuring the reversal of the direction of rotation of the motor.

8. A control box according to claim 5, further comprising a current intensity detector of the magnetic type comprising switching means capable of reversing the supply of the motor when the intensity of the current passing therethrough exceeds a predetermined value, said switching means being connected to a first input of an AND gate which has a second input which is connected in the circuit of the motor ensuring one of the directions of the drive of the motor, said AND gate having an output which is connected in such manner as to close the circuit of the motor for driving the motor in the opposite direction.

9. A control box accordng to any one of the claims 1 to 8, comprising means for shorting the terminals of the motor as soon as the supply thereto ceases.

10. A control box according to claim 9, wherein said shorting means comprise a transistor responsive to a reversal of the polarity at the terminals of the motor after the supply of the motor is cut off, said transistor being capable of shorting said terminals and producing a sudden stoppage of the motor immediately after said cutting off of the supply.

11. A control box according to claim 10, comprising means for actuating the motor in a predetermined direction through switching means other than said detector for the purpose of simultaneously closing a plurality of slidable panels.

12. A control box according to any one of the claims 1 to 8, further comprising means for actuating alternately driving motors of a plurality of slidable panels.

* * * * *